(12) United States Patent
Jiang et al.

(10) Patent No.: US 11,353,620 B2
(45) Date of Patent: Jun. 7, 2022

(54) METHOD AND DEVICE OF PREDICTING RESERVOIR SAND BODIES BASED ON A WIND FIELD-PROVENANCE-BASIN SYSTEM

(71) Applicant: China University of Geosciences (Beijing), Beijing (CN)

(72) Inventors: Zaixing Jiang, Beijing (CN); Yuanfu Zhang, Beijing (CN)

(73) Assignee: CHINA UNIVERSITY OF GEOSCIENCES (BEIJING), Beijing (CN)

( * ) Notice: Subject to any disclaimer, the term of this patent is extended or adjusted under 35 U.S.C. 154(b) by 963 days.

(21) Appl. No.: 16/027,987

(22) Filed: Jul. 5, 2018

(65) Prior Publication Data
US 2019/0056527 A1   Feb. 21, 2019

(30) Foreign Application Priority Data
Aug. 17, 2017   (CN) .......................... 201710711093.2

(51) Int. Cl.
*G01V 99/00*   (2009.01)
*G01V 11/00*   (2006.01)

(52) U.S. Cl.
CPC .......... *G01V 99/005* (2013.01); *G01V 11/002* (2013.01)

(58) Field of Classification Search
CPC ............................ G01V 99/005; G01V 11/002
(Continued)

(56) References Cited

U.S. PATENT DOCUMENTS

2018/0113235 A1*   4/2018   Laverne ............... G01V 99/005

FOREIGN PATENT DOCUMENTS

| CN | 102243678 | 11/2011 |
|---|---|---|
| CN | 102508315 | 6/2012 |

(Continued)

OTHER PUBLICATIONS

Jiang et al, "Sedimentary hydrodynamic study of sand bodies in the upper subsection of the 4th Member of the Paleogene Shahejie Formation in the eastern Dongying Depression", 2014, China University of Petroleum (Beijing) and Springer-Verlag Berlin Heidelberg 2014 (Year: 2014).*

(Continued)

*Primary Examiner* — Chuen-Meei Gan
(74) *Attorney, Agent, or Firm* — Davidson, Davidson & Kappel, LLC

(57) ABSTRACT

A method and a device of predicting reservoir sand bodies based on a wind field-provenance-basin system are provided. The method includes: acquiring geological data of a to-be-predicted area, which includes several of core data, paleontological data, well logging data and seismic data; inputting the geological data into a preset wind field-provenance-basin system model, for generating beach-bar-sand-body formation-process-data for the to-be-predicted area, where the wind field-provenance-basin system model includes several of a paleo-provenance restoration tool, a paleo-wind force restoration tool, a paleo-wind direction restoration tool, a paleo-geomorphology restoration tool and a paleo-water depth restoration tool; and predicting distribution locations where the beach-bar sand bodies are distributed in the to-be-predicted area using geological methods and geophysical methods based on the beach-bar-sand-body formation-process-data.

6 Claims, 2 Drawing Sheets

(58) Field of Classification Search
USPC .......................................................... 703/6
See application file for complete search history.

(56) References Cited

FOREIGN PATENT DOCUMENTS

| CN | 104749394 | | 7/2015 |
|----|-----------|---|--------|
| CN | 104749394 A | * | 7/2015 |
| CN | 104749394 A | | 7/2015 |
| CN | 104765966 A | | 7/2015 |
| CN | 106526697 | | 3/2017 |

OTHER PUBLICATIONS

Luo et al., "The Distribution and Seismic Prediction of Beach Bar Sandbodies in Narrow and Elongate Lacustrine Basin—A Case from Es2 in Chezhen Depression in the East of China", 2012, AAPG2012 Southwest Section Meeting (Year: 2012).*

Search Report from Chinese Patent Application No. CN201710711093.2.

Office Action from Chinese Patent Application No. CN201710711093.2, dated Feb. 14, 2018.

Zhang et al. "Relationship between Meso-Cenozoic Tectonic Subsidence of the Jiyang Depression and Plate Convergence Rate" Geological Journal of China Universities, vol. 11, No. 4, (2005) (Abstract).

Liu et al. "Advances in the Indicator of Palaeowind Direction Reconstruction" Progress in Geography, vol. 30, No. 9 (2011) (Abstract).

Supplementary Serach of Priority Document from Chinese Application No. 2017107110932. In Chinese.

J.P. Le Roux "Estimating palaeowind strength from beach deposits—Discussion" Sedimentology (2004) 51, 669-670.

Zhao Jinhui et al. "Recovery of relative wind speeds in northern China since the Late Pleistocene" Journal of Arid Land Resources and Environment, vol. 30, No. 6, Jun. 2016. (English Abstract) (See Translation A21).

Zhao Jinhui et al. "Restoration of paleo-relative wind speeds in northern China since the Late Pleistocene" Journal of Arid Land Resources and Environment, vol. 30, No. 6, Jun. 2016. (Machine Translation of A20).

Jiang Zaixing et al. "A review of research progress on beach-bar deposition" Journal of Paleogeography, vol. 17. No. 4, Aug. 2015. (English Abstract) (See Translation A23).

Jiang Zaixing et al. "Advances in beach-bar research: A review" Journal of Paleogeography, vol. 17. No. 4, Aug. 2015. (Machine Translation of A22).

Zhang Ye et al. "Applicability of altitude calculation formula for wind banked" Journal of Heilongjiang Engineering College, vol. 27, No. 4, Dec. 2000. (English Abstract) (See Translation A25).

Zhang Ye et al. "Discussion on the Applicable Scope of the Calculation Formula for the Height of the Water Surface due to Wind Constraints" Journal of Heilongjiang Engineering College, vol. 27, No. 4, Dec. 2000.(Machine Translation of A24).

European Search Report from corresponding European Application No. EP 18 17 5399 date of completion of the search Dec. 6, 2018.

Wang Y et al. "Magnetic properties of muddy sediments on the northeastern continental shelves of China: Implication for provenance and transportation" Marine Geology, vol. 274, No. 1-4, (Aug. 15, 2010) p. 107-119.

Liu Quianghu et al. "Sequence Stratigraphy and seismic geomorphology application of facies architecture and sediment-dispersal patterns analysis in the third member of Eocene Shahejie Formation, slope system of Zhanhua Sag, Bohai Bay Basin, China" Marine and Petroleum Geology. vol. 78; 2016; pp. 766-784.

* cited by examiner

METHOD AND DEVICE OF PREDICTING RESERVOIR SAND BODIES BASED ON A WIND FIELD-PROVENANCE-BASIN SYSTEM

CROSS-REFERENCE TO RELATED APPLICATIONS

This application claims priority Chinese Patent Application No. 2017107110932, filed on Aug. 17, 2017 with the State Intellectual Property Office (SIPO) of the People's Republic of China and entitled "Method and Device of Predicting Reservoir Sand Bodies Based on a Wind Field-Provenance-Basin System", the contents of which are herein incorporated by reference in their entirety.

TECHNICAL FIELD

The present disclosure relates to the technical field of geological exploration, particularly to a method and a device for predicting reservoir sand bodies based on a wind field-provenance-basin system.

BACKGROUND ART

In the existing oil fields, most of them have been ascertained for 70% or more. Therefore, it is impossible to prospect more oil fields by the exploration method featured by "finding megageotectonics and analyzing major provenance". It is proved by exploration practices that there may also be reservoir sand bodies formed in areas less affected by a major provenance. There are relatively developed thin interbedded sand bodies in such areas. Adlittoral thin beach-bar sand body of "non-major provenance system" is one of them, and has become the next target which is important to oil-gas exploration, having profound exploration potential and significance. However, it is hard to effectively explore available oil fields by way of predicting reservoir sand bodies which is less feasible and accurate when applied to such oil reservoirs which are thin, difficult to identify and of fine particles.

No effective solution has been proposed yet for the problem that the existing ways of predicting reservoir sand bodies are less feasible and accurate as described above.

SUMMARY

In view of this, embodiments of the present disclosure provide a method and a device of predicting reservoir sand bodies based on a wind field-provenance-basin system, so as to effectively identify and predict the distribution locations and range of adlittoral thin beach-bar sand bodies and to improve the feasibility and accuracy of those ways of predicting reservoir sand bodies.

In a first aspect, the embodiments of the present disclosure provide a method of predicting reservoir sand bodies based on a wind field-provenance-basin system which includes: acquiring geological data of an area to be predicted, which geological data includes more than one of core data, paleontological data, well logging data and seismic data; inputting the geological data into a preset wind field-provenance-basin system model, to generate formation process data of beach-bar sand bodies in the area to be predicted, where the wind field-provenance-basin system model includes more than one of a paleo-provenance restoration tool, a paleo-wind force restoration tool, a paleo-wind direction restoration tool, a paleo-geomorphology restoration tool and a paleo-water depth restoration tool; and predicting, based on the formation process data of the beach-bar sand bodies, the specific distribution locations where the beach-bar sand bodies are distributed in the area to be predicted using geological method(s) and geophysical method(s).

In connection with the first aspect, the embodiments of the present disclosure provide a first possible implementation of the first aspect, where the above step of inputting the geological data into a preset wind field-provenance-basin system model to generate formation process data of beach-bar sand bodies in the area to be predicted includes: processing the geological data using the paleo-wind force restoration tool and the paleo-wind direction restoration tool, to generate a distribution pattern in which the beach-bar sand bodies are distributed in the area to be predicted; processing the distribution pattern in which the beach-bar sand bodies are distributed using the paleo-provenance restoration tool, to generate distribution characteristics and a sedimentary model of the beach-bar sand bodies; and processing the distribution characteristics and the sedimentary model of the beach-bar sand bodies using the paleo-geomorphology restoration tool and the paleo-water depth restoration tool, to generate the distribution locations and range of the beach-bar sand bodies in the area to be predicted.

In connection with the first possible implementation of the first aspect, the embodiments of the present disclosure provide a second possible implementation of the first aspect, where the above step of processing the geological data using the paleo-wind force restoration tool and the paleo-wind direction restoration tool to generate a distribution pattern in which the beach-bar sand bodies are distributed in the area to be predicted includes: extracting eolian sandstone data, clay magnetic susceptibility or aqueous sedimentary structure data from the geological data; restoring the paleo-wind direction for the area to be predicted based on the eolian sandstone data, the clay susceptibility or the aqueous sedimentary structure data; calculating the thickness of a breaker-induced sand bar (break-wave sand bar) or the thickness of a sandy-gravelly coastwise bar in the area to be predicted; restoring the paleo-wind force for the area to be predicted based on the thickness of the breaker-induced sand bar or the thickness of the sandy-gravelly coastwise bar; and performing calculation based on the paleo-wind direction and the paleo-wind force for the area to be predicted to obtain the distribution pattern in which the beach-bar sand bodies are distributed in the area to be predicted.

In connection with the first possible implementation of the first aspect, the embodiments of the present disclosure provide a third possible implementation of the first aspect, where the above step of processing the distribution pattern in which the beach-bar sand bodies are distributed using the paleo-provenance restoration tool to generate distribution characteristics and a sedimentary model of the beach-bar sand bodies includes: performing provenance analysis on the distribution pattern in which the beach-bar sand bodies are distributed using sedimentological method(s), petrological method(s), element geochemical method(s) or geophysical method(s), for restoring the provenance system for the area to be predicted; calculating a denudation quantity of the area to be predicted within a set period of time using geological method(s), geochemical method(s) or geophysical method(s); and performing calculation based on the denudation quantity to obtain the distribution characteristics and the sedimentary model of the beach-bar sand bodies.

In connection with the first possible implementation of the first aspect, the embodiments of the present disclosure provide a fourth possible implementation of the first aspect, where the above step of processing the distribution characteristics and the sedimentary model of the beach-bar sand bodies using the paleo-geomorphology restoration tool and the paleo-water depth restoration tool to generate the distribution locations and range of the beach-bar sand bodies in the area to be predicted includes: restoring the original thickness of the area to be predicted based on the distribution characteristics and sedimentary model of the beach-bar sand bodies; extracting sedimentary facies data and paleontological data from the distribution characteristics and sedimentary model of the beach-bar sand bodies; performing paleo-water depth correction processing on the sedimentary facies data and paleontological data, to generate correction data; restoring the paleo-geomorphology for the area to be predicted based on the original thickness and the correction data; restoring the paleo-water depth for the area to be predicted using a facies sequence method, a ripple mark method or a multi-phylum micro-paleontological method; and performing calculation based on the paleo-geomorphology and the paleo-water depth for the area to be predicted to obtain the distribution locations and range of the beach-bar sand bodies in the area to be predicted by calculation.

In a second aspect, the embodiments of the present disclosure provide a device of predicting reservoir sand bodies based on a wind field-provenance-basin system which includes: a geological data acquisition module configured to acquire geological data of an area to be predicted, which geological data includes more than one of core data, paleontological data, well logging data and seismic data; a beach-bar-sand-body formation-process-data generation module configured to input the geological data into a preset wind field-provenance-basin system model to generate formation process data of beach-bar sand bodies for the area to be predicted, where the wind field-provenance-basin system model includes more than one of a paleo-provenance restoration tool, a paleo-wind force restoration tool, a paleo-wind direction restoration tool, a paleo-geomorphology restoration tool and a paleo-water depth restoration tool; and a prediction module configured to predict, based on the formation process data of the beach-bar sand bodies, the specific distribution locations where the beach-bar sand bodies are distributed in the area to be predicted using geological method(s) and geophysical method(s).

In connection with the second aspect, the embodiments of the present disclosure provide a first possible implementation of the second aspect, where the above beach-bar-sand-body formation-process-data generation module includes: a distribution-pattern generating unit configured to process the geological data using the paleo-wind force restoration tool and the paleo-wind direction restoration tool to generate the distribution pattern in which the beach-bar sand bodies are distributed in the area to be predicted; a distribution-characteristic and sedimentary-model generating unit configured to process the distribution pattern in which the beach-bar sand bodies are distributed using the paleo-provenance restoration tool to generate distribution characteristics and sedimentary model of the beach-bar sand bodies; and a distribution-location and range generating unit configured to process the distribution characteristics and sedimentary model of the beach-bar sand bodies using the paleo-geomorphology restoration tool and the paleo-water depth restoration tool to generate the distribution locations and range of the beach-bar sand bodies in the area to be predicted.

In connection with the first possible implementation of the second aspect, the embodiments of the present disclosure provide a second possible implementation of the second aspect, where the above distribution-pattern generating unit is further configured to extract eolian sandstone data, clay magnetic susceptibility or aqueous sedimentary structure data from the geological data, restore the paleo-wind direction for the area to be predicted based on the eolian sandstone data, clay magnetic susceptibility or aqueous sedimentary structure data, calculate the thickness of a breaker-induced sand bar or the thickness of a sandy-gravelly coastwise bar in the area to be predicted, restore the paleo-wind force for the area to be predicted based on the thickness of the breaker-induced sand bar or the thickness of the sandy-gravelly coastwise bar, and calculate based on the paleo-wind direction and the paleo-wind force for the area to be predicted to obtain the distribution pattern in which the beach-bar sand bodies are distributed in the area to be predicted.

In connection with the first possible implementation of the second aspect, the embodiments of the present disclosure provide a third possible implementation of the second aspect, where the above distribution-characteristic and sedimentary-model generating unit is further configured to perform provenance analysis on the distribution pattern in which the beach-bar sand bodies are distributed using sedimentological method(s), petrological method(s), element geochemical method(s) or geophysical method(s), for restoring the provenance system for the area to be predicted, calculate a denudation quantity of the area to be predicted within a set period of time using geological method(s), geochemical method(s) or geophysical method(s), and calculate based on the denudation quantity to obtain the distribution characteristics and the sedimentary model of the beach-bar sand bodies.

In connection with the first possible implementation of the second aspect, the embodiments of the present disclosure provide a fourth possible implementation of the second aspect, where the above distribution-location and range generating unit is further configured to restore the original thickness for the area to be predicted based on the distribution characteristics and sedimentary model of the beach-bar sand bodies, extract sedimentary facies data and paleontological data from the distribution characteristics and sedimentary model of the beach-bar sand bodies, perform paleo-water depth correction processing on the sedimentary facies data and paleontological data, to generate correction data, restore the paleo-geomorphology for the area to be predicted based on the original thickness and the correction data, restore the paleo-water depth for the area to be predicted using a facies sequence method, a ripple mark method or a multi-phylum micro-paleontological method, and calculate based on the paleo-geomorphology and the paleo-water depth for the area to be predicted to obtain the distribution locations and range of the beach-bar sand bodies in the area to be predicted.

The embodiments of the present disclosure provide the following beneficial effect.

The method and device of predicting reservoir sand bodies based on a wind field-provenance-basin system provided by the embodiments of the present disclosure can efficiently identify and predict the distribution locations and range of adlittoral thin beach-bar sand bodies and improve the feasibility and accuracy of the way of predicting reservoir sand bodies, by way of inputting the geological data of an area to be predicted into a preset wind field-provenance-basin system model, performing processing using a paleo-provenance restoration tool, a paleo-wind force restoration tool, a paleo-wind direction restoration tool, a paleo-geomorphology restoration tool and a paleo-water depth restoration too, etc., to obtain the beach-bar-sand-body formation process data of the area to be predicted, and then predicting the specific distribution locations where the beach-bar sand bodies are distributed in the area to be predicted using geological methods and geophysical methods.

The other features and advantages of the present disclosure will be explained in the following description and will become apparent partially from the description or may be understood by implementing the present disclosure. The object and other advantages of the present disclosure are achieved and obtained by the structure specifically indicated in the description, claims and figures.

To make the above objects, features and advantages of the present disclosure more apparent and understandable, preferred embodiments are provided and detailed below with reference to the accompanied drawings.

BRIEF DESCRIPTION OF DRAWINGS

In order to more clearly explain the technical solutions in the embodiments of the present disclosure or in the prior art, figures to be used in the embodiments or in the description of the prior art will be briefly described. Obviously, the figures in the following description merely show some of the embodiments of the present disclosure. Other figures may be obtained by those ordinarily skilled in the art based on these figures without using creative efforts.

DETAILED DESCRIPTION OF EMBODIMENTS

In order to make the objects, technical solutions and advantages of the embodiments of the present disclosure more clear, the technical solutions provided in the embodiments of the present disclosure will be clearly and comprehensively described with reference to the figures of the present disclosure. Apparently, the embodiments as described are merely some, but not all of the embodiments of the present disclosure. All the other embodiments obtained by those ordinarily skilled in the art based on the embodiments provided in the present disclosure without using creative efforts shall fall within the scope of protection of the present disclosure.

With regard to the problem that existing ways of predicting reservoir sand bodies are less feasible and accurate, the embodiments of the present disclosure provide a method and a device of predicting reservoir sand bodies based on a wind field-provenance-basin system. This technology is applicable to oil-gas exploration in adlittoral thin beach-bar sand bodies with oil reservoirs which are thin, difficult to identify and of fine particles. This technology may be implemented by relevant software or hardware and will be described by way of embodiments below.

Embodiment 1

Figure 1:
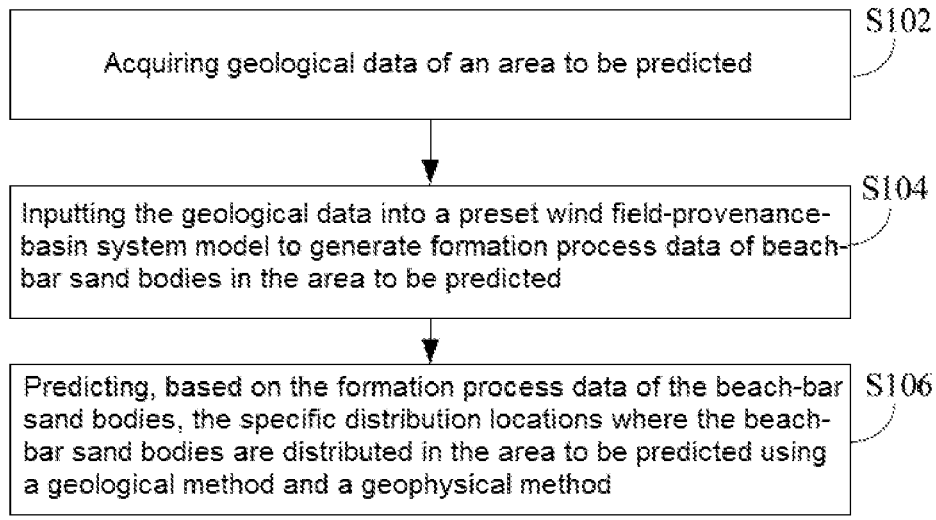
FIG. 1 is a flow chart of a method of predicting reservoir sand bodies based on a wind field-provenance-basin system provided by embodiments of the present disclosure.

Referring to the flow chart of a method of predicting reservoir sand bodies based on a wind field-provenance-basin system as shown in FIG. 1, the method includes the following steps.

Step S102, acquiring geological data of an area to be predicted, where the geological data includes more than one of core data, paleontological data, well logging data and seismic data.

Step S104, inputting the geological data into a preset wind field-provenance-basin system model to generate formation process data of beach-bar sand bodies in the area to be predicted, where the wind field-provenance-basin system model includes more than one of a paleo-provenance restoration tool, a paleo-wind force restoration tool, a paleo-wind direction restoration tool, a paleo-geomorphology restoration tool and a paleo-water depth restoration tool.

Normally, a sedimentation process, occurring in the wind filed-provenance-basin system, involves particularly many factors such as paleo-climate, paleo-provenance, paleo-geomorphology and paleo-water depth and so on. By inputting the geological data into the wind field-provenance-basin system, the above factors' control effects in a geological sedimentation process may be ascertained, and especially, the above factors' control effects on a beach-bar sedimentation process may be restored quantitatively or semi-quantitatively.

Step S106, predicting, based on the formation process data of the beach-bar sand bodies, the specific distribution locations where the beach-bar sand bodies are distributed in the area to be predicted using geological methods and geophysical methods.

The above geophysical methods mainly include seismic exploration, electrical exploration, gravity exploration, magnetic exploration, geophysical well logging and radioactive exploration, etc., in which advanced geophysical measuring instruments are used to measure geophysical field information from underground, and analyzing, processing, inverting and interpreting are performed on the measured information, to provide a speculation about the structure construction and mineral distribution underground.

The method of predicting reservoir sand bodies based on wind field-provenance-basin systems provided by the embodiments of the present disclosure can efficiently identify and predict the distribution locations and range of adlittoral thin beach-bar sand bodies and improve the feasibility and accuracy of the ways of predicting reservoir sand bodies, by way of inputting the geological data of an area to be predicted into a preset wind field-provenance-basin system model, performing processing using a paleo-provenance restoration tool, a paleo-wind force restoration tool, a paleo-wind direction restoration tool, a paleo-geomorphology restoration tool and a paleo-water depth restoration tool, etc., for obtaining the beach-bar-sand-body formation process data of the area to be predicted, and then predicting the specific distribution locations where the beach-bar sand bodies are distributed in the area to be predicted using geological methods and geophysical methods.

Embodiment 2

Figure 2:
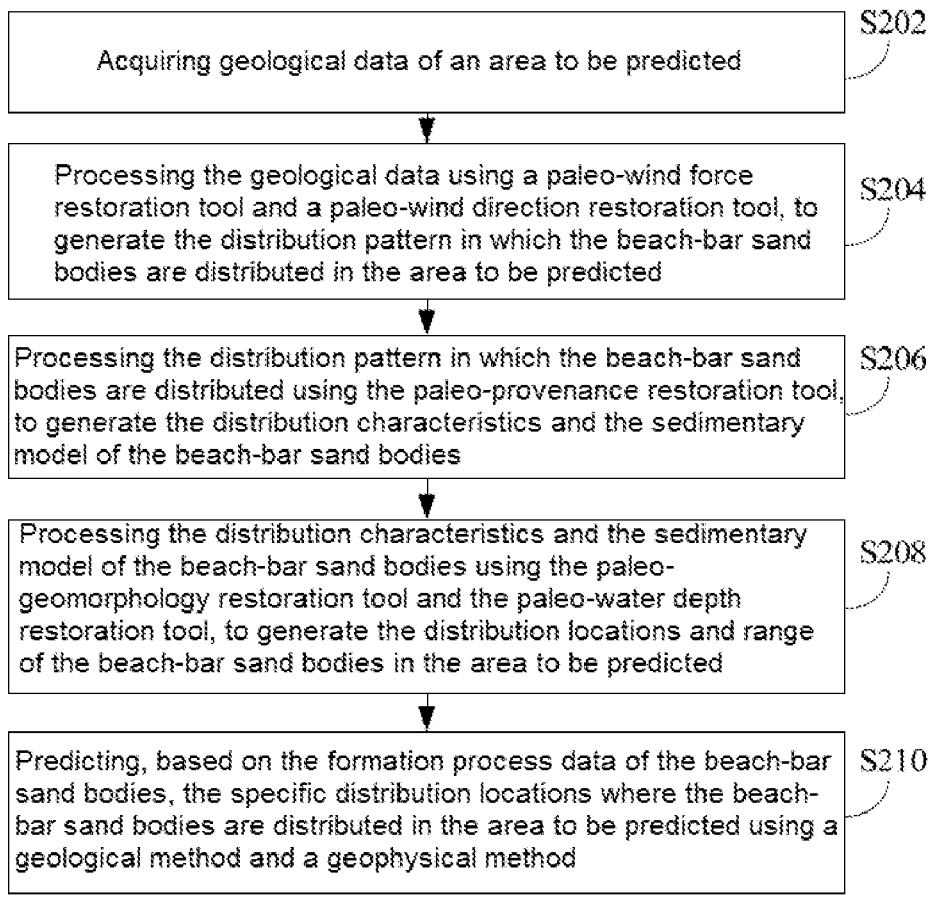
FIG. 2 is a flow chart of another method of predicting reservoir sand bodies based on a wind field-provenance-basin system provided by embodiments of the present disclosure.

Referring to the flow chart of another method of predicting reservoir sand bodies based on a wind field-provenance-basin system as shown in FIG. 2, this method is implemented on the basis of the method of predicting reservoir sand bodies based on a wind field-provenance-basin system provided in Embodiment 1, and this method includes the following steps.

Step S202, acquiring geological data of an area to be predicted, where the geological data includes more than one of core data, paleontological data, well logging data and seismic data.

Step S204, processing the geological data using a paleo-wind force restoration tool and a paleo-wind direction restoration tool, to generate the distribution pattern of the beach-bar sand bodies in the area to be predicted.

Step S204 described above can be specifically implemented by the following Steps 1 to 5.

Step 1, extracting eolian sandstone data, clay magnetic susceptibility or aqueous sedimentary structure data from the geological data;

Step 2, restoring the paleo-wind direction for the area to be predicted based on the eolian sandstone data, clay magnetic susceptibility or aqueous sedimentary structure data.

The eolian sediments related to the above eolian sandstone data are formed under the action of eolian transport. Therefore, a large amount of paleo-climate information is contained in the composition characteristics, sedimentary structure and sedimentary sequence of the eolian sediments per se. Eolian sandstone with high-angle cross bedding may be used as an indication for paleo-wind direction restoration. Cross bedding inside an eolian dune observed in the wild or in a well core may be used to indicate the morphology and movement orientation of the dune, and thus can become a good paleo-wind direction indication. The cross bedding of transverse dunes is mostly tabular, where the foreset laminae are long and flat, and the trend is downwind. The paleo-wind direction may be restored by identifying transverse dunes and utilizing the trend of the foreset laminae.

The long axis direction of the above clay magnetic susceptibility is well corresponding to the wind direction, with a deviation of not more than 20°. The natural remanence direction and sedimentation process of eolian sediments are closely related with each other. Post-depositional action has little influence on them. Therefore, the orientation of the maximum magnetic susceptibility in clay magnetic susceptibility anisotropy is parallel with the orientation of air flow, and may be used to restore the paleo-wind direction.

Wind can directly act on sediments and can also drive other media to move and leave traces in the sediments. Vast surface water body may be seen as a common medium which connects wind force and sediments. Among various surface water bodies, water bodies of lakes have relatively simple movement which is mainly controlled by wind field. An indication for paleo-wind direction restoration may be extracted by carefully analyzing aqueous sedimentary structure data under particular conditions.

Step 3, calculating the thickness of a breaker-induced sand bar or the thickness of a sandy-gravelly coastwise bar in the area to be predicted.

Step 4, restoring the paleo-wind force for the area to be predicted based on the thickness of the breaker-induced sand bar or the thickness of the sandy-gravelly coastwise bar.

In Step 4 above, with the equilibrium between the breaker-induced sand bar and the breakers (break waves) resulting in formation of the sand bar, it is possible to estimate the characteristics of the waves for forming the sand bar based on the thickness of the breaker-induced sand bar, and thereby to restore the wind field condition that produces these waves further based on the relationship between the wind and the waves. Specifically, according to the geometrical morphology of the breaker-induced sand bar, the following relational expression (Equation 1) may be obtained:

$$t_b = d_t - d_b + \frac{(d_t - d_b)\tan\alpha}{\tan\theta} \quad \text{(Equation 1)}$$

where t indicates the original thickness (m) of the breaker-induced sand bar, $d_b$ indicates the breaker water depth, i.e. the water depth (m) at the crest of the breaker-induced sand bar, $d_t$ indicates the water depth (m) of the groove at the shoreward side of the breaker-induced sand bar, a indicates the gradient of the base of the breaker-induced sand bar, θ indicates the gradient of the shoreward side of the breaker-induced sand bar, and the ideal value for tan θ is 0.63.

Assuming $d_t/d_b \approx 1.60$, then Equation 1 may be simplified to $$t_b = (0.6 + 0.95 \tan \alpha) d_b \quad \text{(Equation 2)}$$

Thereby, according to Equation 2, the breaker water depth $d_b$ may be obtained when the thickness $t_b$ of the breaker-induced sand bar and the gradient a that develops the base of the breaker-induced sand bar are known.

According to a Goda curve, the parameter, breaker water depth ($d_b$), may be converted into breaker wave height (Hb). As a wave spreads to the shore, the wave height increases gradually, reaches its maximum at a wave breaking position, and then gradually decreases with the consumption of the wave energy. Therefore, the breaker wave height Hb as determined according to the Goda curve may be approximate to the maximum wave height of the wave in the same period, i.e. Hb≈Hmax. It can be known from the statistical characteristics of the wave, the maximum theoretical wave height Hmax is two times the significant wave height Hs in the deep water area, i.e. Hmax≈2 Hs. Therefore, the breaker wave height Hb at the time the breaker-induced sand bar is formed may be approximately converted into Hs, i.e. Hb≈2 Hs.

Wind pressure coefficient $U_A$ may be obtained by Equation 3 below:

$$U_A = \frac{H_s}{(5.112 \times 10^{-4}) F^{0.5}} \quad \text{(Equation 3)}$$

In Equation 3, F indicates the fetch length (m), and Hs indicates the significant wave height (m) in the deep water area.

The wind pressure coefficient $U_A$ is related to the wind velocity.

$$U_A = 0.71 U^{1.23} \quad \text{(Equation 4)}$$

In Equation 4, U indicates the wind velocity (m/s) at a position 10 m above the water surface.

With the above analysis, the process of restoring the paleo-wind force using the thickness of the breaker-induced sand bar may be obtained. The process includes the following steps of: (1) accurately identifying a breaker-induced sand bar, measuring the maximum thickness of the breaker-induced sand bar formed within a single period, and performing decompaction correction to obtain the original thickness, (2) determining the paleo-geomorphology and the paleo-shoreline of the paleo-lake under research, so as to obtain the paleo-gradient and paleo-wind path, (3) converting the thickness of the breaker-induced sand bar into breaker wave height (Equation 2) based on the morphological characteristics of the breaker-induced sand bar and the paleo-gradient in conjunction with the critical conditions of wave breaking, (4) converting the breaker wave height into the corresponding significant wave height in the deep water area, (5) calculating the corresponding wind pressure coefficient based on the significant wave height in the deep water area and the paleo-wind path (Equation 3), and (6) calculating the wind velocity based on the wind pressure coefficient (Equation 4).

In Step 4 above, the paleo-wind force may be restored using the thickness of the sandy-gravelly coastwise bar based on the relationship between the surf backflow and the coastwise gravelly beach bar. The thickness (tr) of the sandy-gravelly coastwise sand bar approximately records the limit height of the surf backflow, i.e. the limit position that the lake (sea) water reaches landward. This limit height is the sum of windstorm backwater height (hs), wave setup height (hsu) and wave run-up height (Hru), as shown in Equation 5.

$$t_r = h_s = h_{su} + h_{ru} \quad \text{(Equation 5)}$$

As can be seen from Equation 5, the thickness (tr) of the sandy-gravelly coastwise sand bar may be associated with the paleo-wave condition, and thereby the paleo-wind force may be calculated based on the relationship between wind and waves. Specifically, operation method is implemented as follows.

The windstorm setup may be expressed by an wind field parameter and an basin parameter, as shown in Equation 6:

$$h_s = \frac{KU^2 F}{2gd} \cos\gamma \quad \text{(Equation 6)}$$

where K indicates comprehensive frictional resistance coefficient which may be $3.6 \times 10^{-6}$, d indicates the average water depth of the water area, y indicates the included angle between the wind direction and the normal perpendicular to the shoreline, and the other parameters are the same as above.

The wave setup height (hsu) may be approximately 10% of the significant wave height (Hs) in the deep water area, as shown in Equation 7. The wave run-up height (hru) may be approximately 30% of Hs, as shown in Equation 8.

$$h_{su} = 0.1 H_s \quad \text{(Equation 7)}$$

$$h_{ru} = 0.3 H_s \quad \text{(Equation 8)}$$

Equation 6, Equation 7 and Equation 8 are substituted into Equation 5, and Equation 5 may be expressed as follows.

$$t_r = \frac{KU^2 F}{2gd} \cos\gamma + 0.1 H_s + 0.3 H_s \quad \text{(Equation 9)}$$

Further, according to Equation 3 and Equation 4, Equation 9 may be converted into the following one.

$$t_r = \frac{KU^2 F}{2gd} \cos\gamma + (1.452 \times 10^{-4}) U^{1.23} \sqrt{F} \quad \text{(Equation 10)}$$

As can be seen from Equation 10, the paleo-wind velocity (U) may be calculated based on the thickness of the sandy-gravelly coastwise sand bar, under the condition that the paleo-wind path (F), the paleo-water depth (d) of the lake basin and the included angle (y) of the paleo-wind direction relative to the shoreline are known.

According to the above analysis, the method of restoring the paleo-wind force using the thickness of the sandy-gravelly coastwise bar specifically includes the following steps of: (1) accurately identifying a sandy-gravelly coastwise bar formed in a single period from the sedimentary record (e.g. outcrop, well drilling data, and so on) and accurately recording its thickness, (2) performing decompaction correction to obtain its original thickness if the sandy-gravelly coastwise bar has undergone a significant compacting process, (3) restoring the paleo-water depth of the basin based on the sedimentary record, (4) restoring the paleo-wind direction based on the sedimentary record, (5) identifying the paleo-shoreline and accurately acquiring the trend of the paleo-shoreline to obtain, in conjunction with the paleo-wind direction, the paleo-wind path and the included angle between the paleo-wind direction and the normal perpendicular to the shoreline, and (6) calculating the paleo-wind force by Equation 10 based on the above acquired parameters.

Step 5, performing calculation based on the paleo-wind direction and the paleo-wind force for the area to be predicted, to obtain the distribution pattern of the beach-bar sand bodies in the area to be predicted.

Step S206, processing the distribution pattern of the beach-bar sand bodies using the paleo-provenance restoration tool, to generate the distribution characteristics and the sedimentary model of the beach-bar sand bodies.

Step S206 described above can be specifically implemented by the following steps 1 to 3.

Step 1, performing provenance analysis on the distribution pattern of the beach-bar sand bodies using sedimentological methods, petrological methods, element geochemical methods or geophysical methods, to restore the provenance system for the area to be predicted.

In Step 1, a qualitative description about the provenance of the area may be given through the above methods. Clastic-rock-sediment provenance supply system includes provenance area, sedimentation area, migration direction and mode. By studying the provenance supply system in combination with the known development and distribution of the sedimentary system and the characteristic change in the sediments, it is possible to restore the paleo-sediment provenance system to a great extent.

The above sedimentological method is mainly performed based on the principles of sedimentology to a provenance analysis on clastic rocks. For example, an analysis on a sand distribution system may provide proof for provenance analysis. Its spatial structure can not only indicate the paleo-current direction and the number of provenance areas, but also can effectively reveal the range of influence of provenance and its stability which varies over time. For the same sedimentary system, it goes by a general rule that the closer it is to a provenance area, the higher the sand ratio or sand body thickness is. Sand body is generally the main transport passage for sediments. Therefore, the spreading direction of the sand distribution system may indicate the paleo-current direction and thus further indicate the provenance direction.

By making an isopach map of the strata, a contour map of the sandstone-stratum ratio, the sedimentary facies distribution map and other related maps in a certain period based on the well drilling data, logging data and seismic data of the basin, etc. and by a detailed strata comparison and division, it is possible to infer the relative position of the provenance area, and by combination with the paleo-current direction data such as lithological changes, particle size and percentage occupied, bedding and bedding plane structures, and rosette drawings/maps, etc., and an analysis of the paleo-geomorphology, the analysis on the provenance area is more reliable. Provenance analysis by sedimentological methods should be based on plenty of field observation and (or) data statistics, and the analysis should include as many data points as possible to ensure the reliability of the conclusion. In this way, the general direction of the provenance may be determined.

The above research means of petrological methods may play an important role in provenance analysis. The terrigenous clastic rocks in the basin come from the mother rock. Therefore, it is possible to infer the type of the mother rock in the provenance area by the terrigenous clastic combination. Especially, the gravels in glutenite may directly reflect the composition of the mother rock in the base and the provenance area, and also reflect the degree of abrasion, climate conditions and tectonic setting. Therefore, the various characteristics of gravels are direct signs for determining a provenance area and analyzing a sedimentary environment. The rock debris in clastic rocks is also one of the direct signs of provenance. The type and content of rock debris can accurately reflect the lithology of a provenance area, the type and degree of weathering and transport distance. The types of various rock debris and proportions thereof of the same provenance should be consistent.

The above element geochemical method involves macro-elements, characteristic elements and ratio method thereof and microelement (including rare earth elements) methods, etc. Some elements do not tend to migrate during weathering, denudation, transport, sedimentation and diagenesis of the mother rock, and they are nearly equivalently (completely) transferred to clastic sediments. Therefore, they can be used as tracers of sediment provenance, e.g. Th, Sc, Al, Co, Zr, Hf, Ti, Ga, Nb and rare earth element (REE), and so on. The environment and provenance information contained in sediments (sedimentary rocks) may be interpreted by many element geochemical methods, e.g. provenance tracing is performed by studying the composition, combination, relative contents, distribution rule, ratio relationship, multivariate illustrations (multivariable graphs), partition modes of the elements and the relationship between the elements and isotopes. Some characteristic elements in sediments are relatively chemically stable, mainly influenced by the provenance, and are relatively independent of the sedimentary environment and diagenesis, and thus their contents remain substantially unchanged during weathering, denudation, transport, sedimentation and diagenesis. Therefore, they are comparable to some extent in a provenance area and a sedimentary area, and may be used as a good indicator element for provenance. Therefore, identifying a sediment provenance by characteristic element method can effectively avoid the influence from factors such as hydrodynamic force and mineral compositions, etc. and thus highlight the provenance information as much as possible. In addition, one may use an electronic probe and a laser denudation instrument, etc. to measure the macroelements in heavy minerals and microelements in quartz granules, and establish multivariate illustrations and partition modes according to the composition, relative contents and element combinations of mineral elements, for provenance analysis, determination of geotectonic setting and sedimentary environment analysis.

The above geophysical methods mainly include logging geological method and seismic stratigraphic method. The logging geological method mainly uses the fractional dimensions of natural gamma curve and dipmeter logging to determine the provenance direction.

Step 2, calculating the denudation quantity in the area to be predicted within a set period of time using geological methods, geochemical methods or geophysical methods.

In the above, the geological methods include mass balance method, sedimentary rate method, stratigraphic correlation method, trend thickness method and fluctuation analysis method, etc. The geochemical methods include vitrinite reflectance method, apatite fission track analysis method, cosmogenic nuclide analysis method, fluid inclusion method, sporo-pollen method and geothermal method, etc.

The geophysical methods include calculating denudation quantity using acoustic well logging data. In the case where the denudation quantity is relative large and the buried depth is shallow, an interval transit time method may be used to estimate the compaction trend of shales and calculate the denudation quantity. This method follows the basic principle that under normal compaction, the shale porosity attenuates exponentially as the buried depth increases, whereas in a consolidating stratum with uniformly-distributed small pores, the porosity is directly proportional to the acoustic transit time in linear relationship, therefore the interval transit time is linearly dependent on the depth in a semi-logarithmic coordinate system. If an area experiences uplifting and denudation, the normal compaction trend curves of the interval transit time and depth of the shale shift in a direction where compaction degree increases, compared with an area not experiencing denudation. According to such shift trend, the compaction trend line is extended upward to $\Delta t0$ where it has not experienced compaction, and the altitude difference between $\Delta t0$ and the plane of denudation is the denuded thickness.

The operation process comprises: first performing logarithm regression on interval transit time-buried depth curve of the shales above and below the discontinuity plane respectively, which gives two regression equations, and calculating the interval transit time value $\Delta t0$ of the earth surface according the regression equation for the buried depth-internal transit time relation above the discontinuity plane, with the buried depth taken as 0; then substituting $\Delta t0$ into the regression equation for the buried depth-internal transit time below the discontinuity plane, which gives the depth (or height) of the earth surface before denudation relative to the current earth surface, the difference between which and the depth of the discontinuity plane would be the denudation thickness.

Calculating denudation quantity using acoustic logging data usually requires that the denudation thickness is greater than the thickness of the resedimented overlaying stratum, because when the thickness of the resedimented stratum is significantly greater than that of the stratum denudated, the resedimented thickness may modify the compaction trend of the pre-existing stratum.

Step 3, performing calculation based on the denudation quantity to obtain the distribution characteristics and sedimentary model of the beach-bar sand bodies.

Step S208, processing the distribution characteristics and the sedimentary model of the beach-bar sand bodies using the paleo-geomorphology restoration tool and the paleo-water depth restoration tool, to generate the distribution locations and range of the beach-bar sand bodies in the area to be predicted.

Step S208 described above can be specifically implemented by the following Steps 1 to 6.

Step 1, restoring the original thickness of the area to be predicted based on the distribution characteristics and sedimentary model of the beach-bar sand bodies.

In actual implementation, one may extract corresponding lithological and physical data, single well data and seismic data from the above geological data, perform compaction restoration on the lithological and physical data according to a compaction equation to generate first data, perform apparent thickness correction on the single well data and seismic data according to a residual thickness drawing to generate second data, make an equilibrium profile for the seismic data based on the denudation thickness restoration to generate third data, and at last restore the original thickness of the area to be predicted according to the first data, second data and third data.

Step 2, extracting sedimentary facies data and paleontological data from the distribution characteristics and sedimentary model of the beach-bar sand bodies;

Step 3, performing paleo-water depth correction on the sedimentary facies data and paleontological data, to generate correction data;

Step 4, restoring the paleo-geomorphology for the area to be predicted according to the original thickness and the correction data; and Step 5, restoring the paleo-water depth for the area to be predicted using a facies sequence method, a ripple mark method or a multi-phylum micro-paleontological method, wherein the facies sequence method, the ripple mark method or the multi-phylum micro-paleontological method are specifically described below.

(1) Facies Sequence Method

As a coastwise bar is developed at the limit position of surf backflow, its bottom may be seen as the mean water level; a nearshore bar is developed at a surf zone, and assuming it reaches the mean water level when it is fully developed, then the thickness of the nearshore bar records the water depth of the surf zone before it is formed; similarly, an offshore bar (infralittoral bar) is developed at a breaker zone, and assuming it reaches the water depth of the surf zone when it is fully developed (that is to say, the water level corresponding to the crest of the offshore bar is at the same level with the water level corresponding to the base of the nearshore bar), then the water depth of the breaker zone before the offshore bar is formed may be expressed as the thickness of the nearshore bar plus the thickness of the offshore bar; the same may apply to a windstorm affecting zone and restore the water depth of the windstorm affecting zone.

For a certain study area, one should first perform single well facies analysis on core data, well logging data and mud logging data, etc. to identify shallow lakeside beach bar sediment, then choose a well tie profile in a direction perpendicular to the shoreline, record the thickness of bar sand on the basis of an accurate and meticulous comparison of sedimentary facies, and calculate the water depth of each zone through de-compaction correction, and thus make a paleo-water depth contour map on a plane.

(2) Ripple Mark Method

Oscillatory flow-caused ripple marks (wave-built ripple marks) preserved in a geological body provide a good basis for remodeling the parameter, paleo-sedimentation water depth. The study on paleo-ripple marks has made it possible to estimate the paleo-water depth and the conditions for forming paleo-ripple marks by applying mathematical expressions.

First, in order to relatively accurately estimate the depth of a moving water body at the time ripple marks are formed, the types of ripple marks selected should meet certain conditions where the maximum ripple symmetry index is limited to be within 1.5 and the perpendicular morphological index should not be greater than 9.

For symmetrical ripple marks, if the relationship between the ripple mark wavelength $\lambda$ (cm) and the sedimentation particle diameter D ($\mu$m) satisfies $\lambda<0.0028D^{1.68}$, the diameter d0 of the motional orbit of near-bottom water particles may be expressed as follows.

$$d_0 = \lambda/0.65 \qquad \text{(Equation 11)}$$

The critical speed Ut at which the sediments start to move may be expressed by the following Equations:

$$U_{t^2} = 0.21(d_0/D)^{1/2}(\rho_s-\rho)gD/\rho, \ D<0.5 \text{ mm} \qquad \text{(Equation 12)}$$

$$U_t^2 = 0.46\pi(d_0/D)^{1/4}(\rho_s-\rho)gD/\rho, \ D\geq0.5 \text{ mm} \qquad \text{(Equation 13)}$$

where $\rho$ indicates the density of aqueous medium, $\rho$s indicates the density of sediments and g indicates the acceleration of gravity.

For the critical speed Ut, the wavelength of its corresponding water wave is Lt, and they have the following relationship.

$$L_t = \frac{\pi g d_0^2}{2U_t^2} \qquad \text{(Equation 14)}$$

Assuming the ripple marks are formed by breaker, when the wave breaks, there is:

$$H_{max} = 0.142 \times L_t \qquad \text{(Equation 15)}$$

where Hmax indicates the maximum possible wave height of the breaker.

In a shallow water zone, h_H/0.89, where H indicates the breaker wave height (referring to Hmax), and h indicates the paleo-sedimentation water depth.

In the calculation, the wavelength $\lambda$ of the ripple mark is obtained by direct measurement; the diameter D of the sediment particles is obtained by analyzing the particle size of the sedimentary rock, and D is the average particle diameter since the depth recording the ripple mark is a section of depth; the aqueous medium density p may be chosen as appropriate according to the salinity, e.g. 1 g/cm$^3$ for fresh water; the sediment density $\rho$s may be obtained by density logging or by directly measuring a sample; and similarly, since the depth recording the ripple mark is a section of depth, $\rho$s is also the average density. At last, the value of paleo-water depth is calculated using the ripple marks. It should be noted that there has been some change in the ripple mark parameters of the ripple marks preserved in the sedimentary rock due to compaction, compared with those at the time of sedimentation, and therefore, if ripple mark method is used to restore the paleo-water depth, the calculation shall consider the influence of the compaction on the ripple mark parameters and be performed based on those ripple mark parameters subjected to compaction correction.

(3) Multi-Phylum Micro-Paleontological Method

Multi-phylum micro-paleontological method mainly uses the principle that the factor of water depth has control over aquatic organisms in ecology. For aquatic organisms, the aquatic environment where they live is a comprehensive ecological factor as a result of the interaction among various physical, chemical and biological factors. Therefore, different kinds of paleo-organisms have their comfortable depths of survival which may indicate water depths. The water depth range which reflects primitive environments may be obtained by analyzing demersal macro-algae, and combining the environments where other syngenetic organisms live or other preserved environments.

For a specific study area, restoring paleo-water depth using the multi-phylum micro-paleontological method specifically comprises: (1) performing method research and determining the water depth determination signs and criteria; (2) collecting paleo-organism data and samples; (3) analyzing, processing and identifying the paleo-organism data and samples; (4) analyzing the ecology and depth for each type of paleo-organisms; (5) performing multi-phylum deep composite analysis on individual samples; and (6) performing multi-factor weighted comprehensive analysis.

Step 6, performing calculation based on the paleo-geomorphology and the paleo-water depth for the area to be predicted to obtain the distribution locations and range of the beach-bar sand bodies in the area to be predicted.

Step S210, predicting, based on the formation process data of the beach-bar sand bodies, the specific distribution locations where the beach-bar sand bodies are distributed in the area to be predicted using geological methods and geophysical methods.

By using a wind field-provenance-basin system model, the method of predicting reservoir sand bodies based on a wind field-provenance-basin system provided by the embodiments of the present disclosure may provide a more comprehensive and reasonable explanation regarding beach-bar sedimentation system and predict the distribution of oil-gas reservoirs in thin interbedded sand bodies from a new point of view. One may predict the possibility that beach-bar sand bodies may develop in a non-major provenance system control area by establishing a wind field-provenance-basin system model, mainly using paleo-provenance, paleo-geomorphology, paleo-wind force, paleo-wind direction and paleo-water depth as the main means for prediction of beach-bar sand bodies, and restoring and deducing the formation and evolution of the beach-bar sand bodies, and further identify and predict, in combination with geophysical means, the favorable area where beach-bar sand bodies may develop. The establishment of the wind field-provenance-basin system model and the application of geophysical means can break through the bottleneck that it is difficult to predict and identify thin interbedded sand bodies in gas exploration. This enables efficient identification and prediction of the distribution locations and range of adlittoral thin beach-bar sand bodies, and improves the feasibility and accuracy of those ways of prediction reservoir sand bodies.

Embodiment 3

Figure 3:
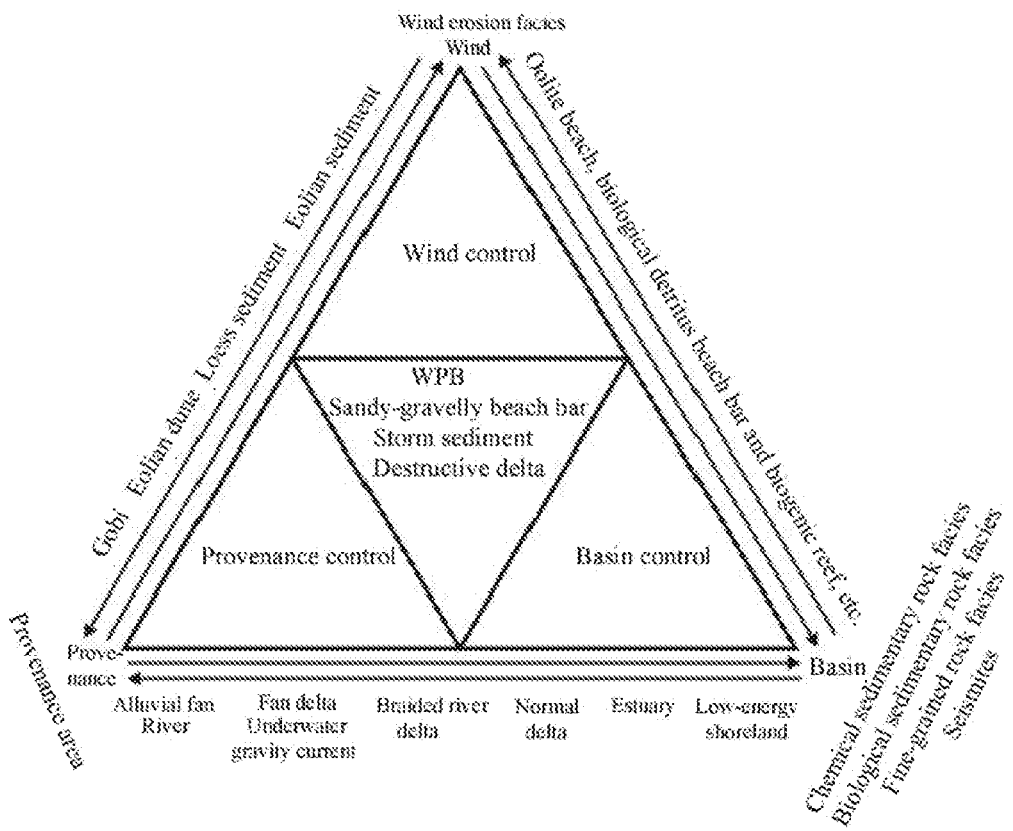
FIG. 3 is a structural schematic diagram of a wind field-provenance-basin system provided by embodiments of the present disclosure.

Refer to FIG. 3 which shows the structural schematic diagram of a wind field-provenance-basin system which corresponds to the method of predicting reservoir sand bodies based on a wind field-provenance-basin system provided in Embodiment 1 or Embodiment 2 described above. In this embodiment, the wind field-provenance-basin system may be referred to as "WPB system" for short.

Taking beach bar as an example, the development of a beach bar is sensitive to the various elements of the WPB system, and those on the surface mainly develop in those places with constant and stable wave action, rich sedimentary provenance and small difference in paleo-landforms. That is, their formation and distribution are mainly subjected to hydrodynamic force, provenance, paleo-structure characteristics of the basin and water depth, etc. Consequently, the development of beach bars is subjected to the "WPB" system. And those elements do not work independently from each other, but control the formation of sediments together and they interact with each other.

(1) Interaction Between Wind and Paleo-Geomorphology

The slopes and micro-topography of a shore zone not only directly affect the width of the hydrodynamic zones of the shore zone, but also directly controls the position of breaker zones and the hydrodynamic force conditions of the shore circulation system. In the gentle slope belt of a depression lacustrine basin or fault lacustrine basin, the shore zone is extensive, and therefore the waves act in a wide range and thus can act on demersal sediments in a wide range.

The actual refraction pattern of waves depends on the characteristics of the nearshore landform. The irregular shoreline and the local fluctuant micro-topography will result in distortion of the wave direction lines and wave crest lines in shallow water zone, which will then have many variations. The wave refraction resulted from the above reasons causes the wave crest line to be parallel with the isobaths, which also has direct influence on the distribution of wave energy. For example, the wave direction lines concentrate in the case of convex bank and ridge-like microtopography, but splits to two sides in case of concave bank and canyon-like microtopography, and the wave energy concentrates where the amplitude concentrates, and fades away quickly, and disperses where the amplitude disperses. Therefore, the convex bank, the circumference of a positive tectonic unit and the windward side of a slope unit are generally the energy dissipation zone where the wave motion energy suddenly decreases, facilitating the unloading of sediments. The hydrodynamic energy in a concave bank and a negative tectonic unit is relatively low. Such difference in wave energy results in different sedimentation in different micro-geomorphic units. In a shore zone with parallel isobath and monoclinal landform, the hydrodynamic zones are nearly parallel to the shoreline, and the erosion and accumulation of sediments are usually parallel to the shoreline.

Waves also have certain influence on the micro-paleo-geomorphology of the shore zone. The transport and sedimentation of sediments in the shore zone are strictly subjected to the hydrodynamic conditions. Therefore, different hydrodynamic zones usually have different micro-geomorphologic shapes. Taking a shore zone with monoclinal and flat gentle slopes as an example, offshore bars formed at breaker zones and nearshore bars formed at surf zones often appear in multiple columns or single column and are distributed regularly as convex ones and concave ones, sometimes even in a large scale. Especially when there is a windstorm, the destroying effect and reshaping effect thereof on the geomorphologic form of nearshore shallow water zone are much stronger than usual. Incident waves which are skew to the shoreline may form a spit at the concave bank due to energy decrease, which will further develop into a barrier island, and then a bay which is half isolated with a lake is formed.

(2) Interaction Between Provenance and Paleo-Geomorphology

The macro-paleo-geomorphological pattern has strict control over the provenance, as the paleo-geomorphology controls the dispersion direction of water current and the center of accumulation of sediments. The direction and distribution of provenance supply are influenced by the paleo-geomorphology, and thus the convex places or highlands above the base level generally will experience denudation, leading to a provenance area, which decides the distribution pattern of the provenance system and the water system. Ravines are the main transport channels for clastics.

Fault slope break belts and depositional slope break belts are the areas where hydrodynamic energy is weakened and where sediments are unloaded.

Different paleo-geomorphological locations have different provenance supply and distribution. For example, above a lake level, rivers (provenance supply rate <0.6) and alluvial fans (provenance supply rate >0.6) develop successively, by an increasing sequence of the provenance supply rate. In underwater uplifts, when the provenance supply rate is <0.6, carbonatite beach bars develop in a dominant way, whereas when the provenance supply rate is >0.6, draping deltas develop in a dominant way. In underwater slope areas and shallow lakeside depressions, when the provenance supply rate is >0.6, deltas develop in a dominant way, when the provenance supply rate is 0.2-0.6, sandy beach bars develop in a dominant way, and when the provenance supply rate is <0.2, carbonatite beach bars develop in a dominant way. In semi-depth lacustrine depressions, argillaceous sediments or turbidite fans develop in a dominant way; when the provenance supply rate is <0.2, argillaceous suspended sediments develop; when the provenance supply rate is 0.2-0.6, small- and medium-sized turbidite fans develop; and when the provenance supply rate is 0.6-1, large turbidite fans develop.

(3) Interaction Between Water Depth and Provenance

Even in geological time when the tectonic movement is stable, the area of a provenance area does not remain constant, instead, it is controlled by the change in the relative lake level. The change in the relative lake level influences the expansion and shrinkage of the provenance area. Such change is especially obvious in gentle slope belts of a fault lacustrine basin or in a depression lacustrine basin. Water depth change of several meters can often cause the lake shoreline on a flat slope to swing by thousands of meters or even tens of thousands of meters on the plane.

In different strata sequence locations or different phases of change in lake level, the change in the provenance area influences the occurrence of sedimentation. During lowstand period, the lake level lowers, the provenance action enhances relatively and the provenance supply index increases, often leading to progradational sand body combination; and during highstand period, since the water area expands, local small provenance's action weakens or vanishes, the provenance supply index is low, and the provenance area suffers strong destruction and reconstruction by wave action. Taking beach bars as an example, during the course where the provenance action wanes and the relative lake level waxes or the other way around, in the vicinity of the transitional surface where the relative lake level falls/rises, during the rising period of the relative lake level controlled by a low accommodation space, it favors most the development of beach bars. During such period, the provenance supply is sufficient and the hydrodynamic conditions also start to increase.

(4) Interaction Between Wind Power and Provenance

The formation of clastic shallow lakeside beach bars mainly result from the reconstruction and secondary distribution of early-formed sand bodies caused by waves, but wind wave power and sufficient provenance supply are also essential, wherein wind waves provide power for formation of beach bars and provenance provide material foundation for the beach bars. In the case of short of provenance supply, generally carbonate beach bars are formed.

In addition to the sedimentation of beach bars, the interaction between wind power and provenance also functions in other sedimentary systems. For example, in inland areas, the transport capability of wind and the supply intensity of sediments decide the occurrence of erosion-sedimentation: when the provenance supply is sufficient enough and beyond the transport capability of wind, generally sedimentation prevails, e.g. resulting in formation of sand dunes in a wide range and other wind-accumulated landforms; and in the case of strong wind power condition and weak provenance supply, generally wind erosion prevails, tending to form gobi deserts and other wind-erosion landforms.

Besides the beach bar system, the control effect of the "WPB" system may also function in various sedimentary systems. The "WPB" system may be further divided into seven subsystems (as shown in FIG. 3) which are briefly described below:

The "WPB" system contains three end members which are (1) wind control system which also contains climatic characteristics such as temperature and humidity under the control of wind field, uses wind as the main geologic agent, takes no account of the internal effect of the provenance and the basin, centers on wind erosion and is featured by various wind erosion landforms, (2) provenance control system which centers on provenance effect, takes no account of climatic conditions and various basin factors, mainly contains various kinds of provenance and forms denuded zones, and (3) basin control system which uses the basin per se as the main agent, takes no account of climate or provenance effect, and where mainly the mechanism of the basin per se works, e.g. accumulation of biological detritus, various chemical actions, biochemical actions, seismic sedimentation actions and the like.

Any two of the three end members of the "WPB" system may also interact with each other to form (1) a wind-provenance system where the wind action, its accompanying cold/warm and dry/humid climate conditions and the provenance supply predominate, the basin's effect is weak, and which is featured by various Eolian facies (e.g. eolian dunes and eolian loess) and also contains silt, clay and sporopollen, etc. transported by the wind to water basins and deposited together with the aqueous sediments, (2) a wind-basin system where the wind action, its accompanying cold/warm and dry/humid climate conditions and the basin action predominate, and which has no terrigenous detritus supply and is featured by oolite beach bars, biological detritus beach bars and gypsum rocks, etc., and (3) provenance-basin system which has sufficient provenance supplies and takes the construction and sequence evolution of basins into account, and where the wind field and its accompanying cold/warm and dry/humid climate conditions do not predominate/, at this time, it is mainly the provenance effect and the internal effect of basins that form various sedimentary systems, e.g. alluvial fans (fans, braided rivers, normal ones), deltas, underwater gravity current and fine-grained rocks mainly consisting of terrigenous detritus substances.

In addition, the three end members of the "WPB" system may also interact with each other. Beach bar is the product of the combined action among wind field, provenance and basin (including the tentonic characteristics, geomorphic characteristics and change in water depth). As described before, waves provide the power for formation of beach bars. Wind forms waves. The hydrodynamic zones of the waves decide the distribution pattern of beach-bar sand bodies. On the premise that prevailing wind is present, the windward side of the basin favors the development of beach bars. Provenance is the material basis for forming beach bars. The strength and orientation of provenance affects the distribution characteristics and sedimentation mode on the beach bar plane. The paleo-geomorphology and paleo-water depth in the course of basin evolution decides the development location and range of beach bars. On the plane, the macro-paleo-geomorphology decides the development range of beach-bar sand bodies for which gentle slope belts are most favorable. The micro-paleo-geomorphology affects local hydrodynamic energy fluctuation. The flanks of nose-like structures and underwater paleo-uplift developing areas have shallow water bodies. The windward slope zones of such positive geomorphic units are the wave energy dissipation zones, and thus favor the development of beach bars. In addition, the sequence evolution of basins can also affect the development of beach bars. Beach bar system develops at shallow water areas which have overall small accommodation space and are sensitive to the change in the accommodation space of a basin resulting from basement sedimentation and sea (lake) level change, and favor the preservation of beach-bar sand bodies near the transitional surface where the relative lake level falls/rises. Generally, large and thick beach-bar sand bodies tend to develop at those places, with windward sides, gentle slope zones, positive landforms and sufficient provenance and at the transition stage of the lake level from a low level to a high level. Carbonatite beach bars may develop at those areas with insufficient provenance supply and weak hydrodynamic conditions.

The union of the "WPB" system is also reflected in storm sediments. For example, as Dongying depression paleogene is under the influence of the west Pacific typhoon, the eastern area of Lijin sag, which is close to basin-controlling fault, has steep slopes, a large water depth and rich provenance, and provides good paleo-geographical conditions for the formation of storm sediments, as described below. (1) Dongying depression, which develops near the shoreline, is often affected by the cyclone (typhoon) from the sea. Under the action of windstorm, not only large scale of waves appear in the lake, but also the lake water will sway and oscillate, forming dammed water at the windward side of the lake and lifting the lake level. In contrast, the lake level falls on the leeward side. As the windstorm weakens, the lake water moves in a reverse direction and oscillate until it becomes level again. (2) The fan deltas developing in the same period at convex southern slopes of Binxian keep prograding, which may provide sufficient provenance. The oscillation of lake water may erode and re-suspend the delta sediments which will then be carried to deep water zones with the oscillation of lake water and preserved. (3) According to the analysis on single-well sedimentary facies and sequence stratification, storm sediments mainly develop in the late stage of lowstand system tract, because in this stage, the range of lake water begins to expand and the water body energy increases, tending to form storm sediments. (4) The paleo-topography during storm sedimentation has a steep gradient which can be up to 2-3°. As incident sedimentation, steep gradient is a favorable condition for the development of storm sediments. Therefore, storm action, sufficient provenance, large water depth and steep gradient are favorable conditions for the development of storm sediments and reflect the union of the elements, wind field, provenance and basin.

Embodiment 4

Figure 4:
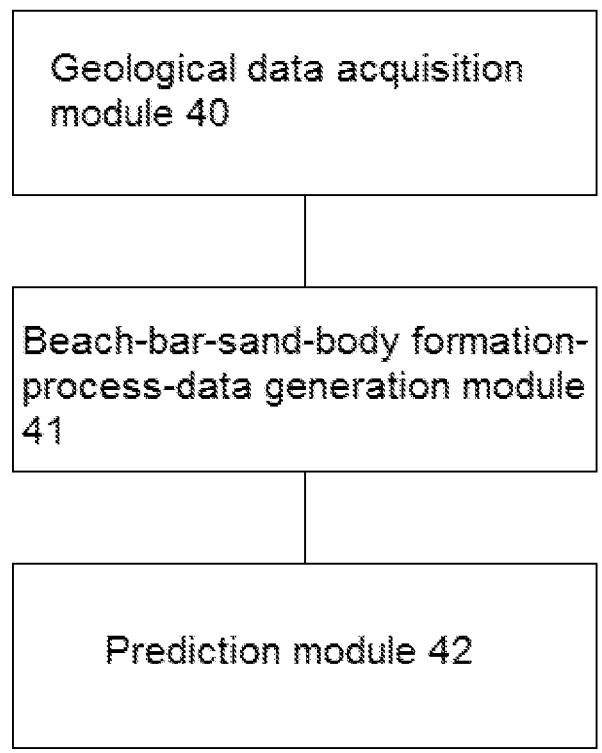
FIG. 4 is a structural schematic diagram of a device of predicting reservoir sand bodies based on a wind field-provenance-basin system provided by embodiments of the present disclosure.

Corresponding to the method of predicting reservoir sand bodies based on a wind field-provenance-basin system provided in Embodiment 1 or Embodiment 2 above, see FIG. 4 which shows the structural schematic diagram of a device of predicting reservoir sand bodies based on a wind field-provenance-basin system which includes:

a geological data acquisition module 40 which is configured to acquire geological data of an area to be predicted, wherein the geological data includes more than one of core data, paleontological data, well logging data and seismic data;

a beach-bar-sand-body formation-process-data generation module 41, which is configured to input the geological data into a preset wind field-provenance-basin system model to generate beach-bar-sand-body formation process data for the area to be predicted, where the wind field-provenance-basin system model includes more than one of a paleo-provenance restoration tool, a paleo-wind force restoration tool, a paleo-wind direction restoration tool, a paleo-geomorphology restoration tool and a paleo-water depth restoration tool; and a prediction module 42, which is configured to predict the specific distribution locations where the beach-bar sand bodies are distributed in the area to be predicted using geological methods and geophysical methods based on the beach-bar-sand-body formation process data.

Further, the above beach-bar-sand-body formation-process-data generation module includes: a distribution pattern generating unit configured to process the geological data using the paleo-wind force restoration tool and the paleo-wind direction restoration tool to generate the distribution pattern of the beach-bar sand bodies in the area to be predicted; a distribution-characteristic and sedimentary-model generating unit configured to process the distribution pattern of the beach-bar sand bodies using the paleo-provenance restoration tool to generate distribution characteristics and sedimentary model of the beach-bar sand bodies; and a distribution-location and range generating unit configured to process the distribution characteristics and sedimentary model of the beach-bar sand bodies using the paleo-geomorphology restoration tool and the paleo-water depth restoration tool to generate the distribution locations and range of the beach-bar sand bodies in the area to be predicted.

Further, the above distribution pattern generating unit is further configured to extract eolian sandstone data, clay magnetic susceptibility or aqueous sedimentary structure data from the geological data, restore the paleo-wind direction for the area to be predicted based on the eolian sandstone data, clay magnetic susceptibility or aqueous sedimentary structure data, calculate the thickness of a breaker-induced sand bar or a sandy-gravelly coastwise bar in the area to be predicted, restore the paleo-wind force for the area to be predicted based on the thickness of the breaker-induced sand bar or the thickness of the sandy-gravelly coastwise bar, and calculate based on the paleo-wind direction and the paleo-wind force for the area to be predicted to obtain the distribution pattern of the beach-bar sand bodies in the area to be predicted.

Further, the above distribution-characteristic and sedimentary-model generating unit is further configured to perform provenance analysis on the distribution pattern of the beach-bar sand bodies using a sedimentological method, a petrological method, an element geochemical method or a geophysical method, for restoring the provenance system for the area to be predicted, calculate a denudation quantity of the area to be predicted within a set period of time using a geological method, a geochemical method or a geophysical method, and calculate based on the denudation quantity to obtain the distribution characteristics and the sedimentary model of the beach-bar sand bodies.

Further, the above distribution-location and range generating unit is further configured to restore the original thickness for the area to be predicted based on the distribution characteristics and sedimentary model of the beach-bar sand bodies, extract sedimentary facies data and paleontological data from the distribution characteristics and sedimentary model of the beach-bar sand bodies, perform paleo-water depth correction processing on the sedimentary facies data and paleontological data to generate correction data, restore the paleo-geomorphology for the area to be predicted based on the original thickness and the correction data, restore the paleo-water depth for the area to be predicted using a facies sequence method, a ripple mark method or a multi-phylum micro-paleontological method, and calculate based on the paleo-geomorphology and the paleo-water depth for the area to be predicted to obtain the distribution locations and range of the beach-bar sand bodies in the area to be predicted.

The computer program product of the method and device of predicting reservoir sand bodies based on a wind field-provenance-basin system provided by the embodiments of the present disclosure includes a computer readable storage medium storing program codes. The instructions included in the program codes may be used to perform the method described in the previous method embodiments. See the method embodiments for details which will not be repeated here.

The functions may be stored in a computer readable storage medium if implemented as software function units and sold or used as independent products. Based on such understanding, the technical solution in essence or the part of the present disclosure that contributes to the prior art or a part of the technical solution may be embodied as software products. The computer software products are stored in a storage medium, and include several instructions for a computer device (which may be e.g. a personal computer, a server or a network device) to perform all or part of the steps of the method described by the various embodiments of the present disclosure. And the aforementioned storage medium includes USB flash disk, Read-Only Memory (ROM), Random Access Memory (RAM), magnetic disk or optical disk which may store program codes.

At last, it should be noted that the above embodiments are merely specific implementations of the present disclosure and used to illustrate the technical solutions of the present disclosure, rather than to limit the present disclosure. The scope of protection of the present disclosure is not limited thereto. Although the present disclosure is described in details with reference to the above embodiments, those ordinarily skilled in the art should understand that any skilled person familiar with the present technical field may still modify the technical solutions described by the above embodiments or readily envisage variations or replace part of the technical features therein with equivalents within the technical scope disclosed by the present disclosure. Such modifications, variations or replacements should not depart the respective technical solutions from the spirit and scope of the technical solutions described by the embodiments of the present disclosure, and shall be encompassed by the scope of protection of the present disclosure. Therefore, the scope of protection of the present disclosure is subject to that defined by the claims.

The invention claimed is:

1. A method of predicting reservoir sand bodies based on a wind field provenance-basin system, comprising steps of:
acquiring geological data of an area to be evaluated for distribution of beach-bar sand bodies, wherein the geological data comprises more than one of core data, paleontological data, well logging data and seismic data;
inputting the geological data into a preset wind field-provenance-basin system model using a computer to generate formation process data of beach-bar sand bodies in the area to be evaluated, wherein the wind field-provenance-basin system model comprises a paleo-provenance restoration tool, a paleo-wind force restoration tool, a paleo-wind direction restoration tool, a paleo-geomorphology restoration tool and a paleo-water depth restoration tool; and
predicting, based on the formation process data of the beach-bar sand bodies and using a computer, distribution locations where the beach-bar sand bodies are distributed in the area to be predicted using a geophysical method, wherein the geophysical method includes geological methods and further wherein the geophysical method includes seismic exploration, electrical exploration, gravity exploration, magnetic exploration, geophysical well logging and radioactive exploration, wherein the step of inputting the geological data into the preset wind field-provenance-basin system model to generate formation process data of beach-bar sand bodies for the area to be predicted comprises:
processing the geological data using the paleo-wind force restoration tool and the paleo-wind direction restoration tool to generate the distribution pattern in which the beach-bar sand bodies are distributed in the area to be predicted;
processing the distribution pattern in which the beach-bar sand bodies are distributed using the paleo-provenance restoration tool to generate distribution characteristics and a sedimentary model of the beach-bar sand bodies; and
processing the distribution characteristics and the sedimentary model of the beach-bar sand bodies using the paleo-geomorphology restoration tool and the paleo-water depth restoration tool, to generate distribution locations and range of the beach-bar sand bodies in the area to be predicted, and wherein the step of processing the geological data using the paleo-wind force restoration tool and the paleo-wind direction restoration tool to generate the distribution pattern in which the beach-bar sand bodies are distributed in the area to be predicted comprises:
extracting eolian sandstone data, clay magnetic susceptibility or aqueous sedimentary structure data from the geological data;
restoring a paleo-wind direction for the area to be predicted to restore the direction and level of paleo-wind force based on the eolian sandstone data, the clay magnetic susceptibility or the aqueous sedimentary structure data;
calculating a thickness of a breaker-induced sand bar or a thickness of a sandy-gravelly coastwise bar in the area to be predicted;
restoring paleo-wind force for the area to be predicted to restore the direction and level of paleo-wind force based on the thickness of the breaker-induced sand bar or the thickness of the sandy-gravelly coastwise bar;
performing calculation based on the paleo-wind direction and the paleo-wind force for the area to be predicted to obtain the distribution pattern in which the beach-bar sand bodies are distributed in the area to be predicted; and using the distribution pattern in which the beach-bar sand bodies are distributed in the area to be predicted to predict the reservoir sand bodies.

2. The method according to claim 1, wherein the step of processing the distribution pattern in which the beach-bar sand bodies are distributed using the paleo-provenance restoration tool to generate distribution characteristics and a sedimentary model of the beach-bar sand bodies comprises:
   performing provenance analysis on the distribution pattern in which the beach-bar sand bodies are distributed using a sedimentological method, a petrological method, an element geochemical method or the geophysical method, to restore the provenance system for the area to be predicted;
   calculating a denudation quantity of the area to be predicted within a set period of time using a geological method, the geochemical method or the geophysical method; and
   performing calculation based on the denudation quantity to obtain the distribution characteristics and the sedimentary model of the beach-bar sand bodies.

3. The method according to claim 1, wherein the step of processing the distribution characteristics and the sedimentary model of the beach-bar sand bodies using the paleo-geomorphology restoration tool and the paleo-water depth restoration tool to generate distribution locations and range of the beach-bar sand bodies in the area to be predicted comprises:
   restoring an original thickness of the area to be predicted based on the distribution characteristics and the sedimentary model of the beach-bar sand bodies;
   extracting sedimentary facies data and paleontological data from the distribution characteristics and the sedimentary model of the beach-bar sand bodies;
   performing paleo-water depth correction processing on the sedimentary facies data and paleontological data to generate correction data;
   restoring paleo-geomorphology of the area to be predicted according to the original thickness and the correction data;
   restoring a paleo-water depth of the area to be predicted using a facies sequence method, a ripple mark method or a multi-phylum micro-paleontological method; and
   performing calculation based on the paleo-geomorphology and the paleo-water depth of the area to be predicted to obtain the distribution locations and range of the beach-bar sand bodies in the area to be predicted.

4. A computing device of predicting reservoir sand bodies based on a wind field-provenance-basin system the computing device having a processor and non-transitory computer readable storage medium, the computing device having a set of modules stored on the non-transitory computer readable storage medium and executed by the processor, the modules, comprising:
   a geological data acquisition module which is configured to acquire geological data of an area to be evaluated for distribution of beach-bar sand bodies, wherein the geological data comprises core data, paleontological data, well logging data and seismic data;
   a beach-bar-sand-body formation-process-data generation module which is configured to input the geological data into a preset wind field-provenance-basin system model to generate formation process data of beach-bar sand bodies in the area to be evaluated, wherein the wind field-provenance-basin system model comprises more than one of a paleo-provenance restoration tool, a paleo-wind force restoration tool, a paleo-wind direction restoration tool, a paleo-geomorphology restoration tool and a paleo-water depth restoration tool; and
   a prediction module which is configured to predict, using a computer and based on the formation process data of beach-bar sand bodies, distribution locations where the beach-bar sand bodies are distributed in the area to be predicted using a geophysical method, wherein the geophysical method includes geological methods and further wherein the geophysical method includes seismic exploration, electrical exploration, gravity exploration, magnetic exploration, geophysical well logging and radioactive exploration,
   wherein the beach-bar-sand-body formation-process-data generation module comprises:
   a distribution pattern generating unit which is configured to process the geological data using the paleo-wind force restoration tool and the paleo-wind direction restoration tool, for generating the distribution pattern in which the beach-bar sand bodies are distributed in the area to be predicted using a computer;
   a distribution-characteristic and sedimentary-model generating unit which is configured to process the distribution pattern in which the beach-bar sand bodies are distributed using the paleo-provenance restoration tool, for generating distribution characteristics and a sedimentary model of the beach-bar sand bodies; and
   a distribution-location and range generating unit which is configured to process the distribution characteristics and the sedimentary model of the beach-bar sand bodies using the paleo-geomorphology restoration tool and the paleo-water depth restoration tool, for generating distribution locations and range of the beach-bar sand bodies in the area to be predicted,
   wherein the distribution pattern generating unit is further configured to:
   extract eolian sandstone data, clay magnetic susceptibility or aqueous sedimentary structure data from the geological data;
   restore a paleo-wind direction in the area to be predicted to restore the direction and level of the paleo-wind force based on the eolian sandstone data, the clay magnetic susceptibility or the aqueous sedimentary structure data;
   calculate a thickness of a breaker-induced sand bar or a thickness of a sandy-gravelly coastwise bar in the area to be predicted;
   restore paleo-wind force in the area to be predicted to restore the direction and level of the paleo-wind force based on the thickness of the breaker-induced sand bar or the thickness of the sandy-gravelly coastwise bar;
   performing calculation based on the paleo-wind direction and the paleo-wind force in the area to be predicted to obtain the distribution pattern in which the beach-bar sand bodies are distributed in the area to be predicted; and
   using the distribution pattern in which the beach-bar sand bodies are distributed in the area to be predicted to predict the reservoir sand bodies.

5. The computing device according to claim 4, wherein the distribution-characteristic and sedimentary-model generating unit is further configured to:
   perform provenance analysis on the distribution pattern in which the beach-bar sand bodies are distributed using a sedimentological method, a petrological method, an element geochemical method or the geophysical method, to restore the provenance system for the area to be predicted;

calculate a denudation quantity of the area to be predicted within a set period of time using a geological method, the geochemical method or the geophysical method;

performing calculation based on the denudation quantity to obtain the distribution characteristics and the sedimentary model of the beach-bar sand bodies.

6. The computing device according to claim 4, wherein the distribution-location and range generating unit is further configured to:

restore an original thickness of the area to be predicted based on the distribution characteristics and the sedimentary model of the beach-bar sand bodies;

extract sedimentary facies data and paleontological data from the distribution characteristics and the sedimentary model of the beach-bar sand bodies;

perform paleo-water depth correction processing on the sedimentary facies data and paleontological data, for generating correction data;

restore paleo-geomorphology of the area to be predicted according to the original thickness and the correction data;

restore a paleo-water depth of the area to be predicted using a facies sequence method, a ripple mark method or a multi-phylum micro-paleontological method; and performing calculation based on the paleo-geomorphology and the paleo-water depth of the area to be predicted to obtain the distribution locations and range of the beach-bar sand bodies in the area.

* * * * *